United States Patent [19]

Vo

[11] Patent Number: 4,928,290
[45] Date of Patent: May 22, 1990

[54] CIRCUIT FOR STABLE SYNCHRONIZATION OF ASYNCHRONOUS DATA

[75] Inventor: Tri T. Vo, San Diego, Calif.

[73] Assignee: NCR Corporation, Dayton, Ohio

[21] Appl. No.: 268,147

[22] Filed: Nov. 7, 1988

[51] Int. Cl.$^5$ .............................................. H04L 7/02
[52] U.S. Cl. ........................................ 375/118; 341/61
[58] Field of Search ............... 375/106, 111, 117, 119, 375/118, 110; 370/84, 102; 341/61

[56] References Cited

U.S. PATENT DOCUMENTS

| | | | |
|---|---|---|---|
| 3,575,215 | 4/1971 | Boddy | 328/139 |
| 3,612,906 | 10/1971 | Kennedy | 307/269 |
| 3,751,683 | 8/1973 | Drost | 307/218 |
| 3,961,138 | 6/1976 | Fellinger | 375/111 |
| 4,007,421 | 2/1977 | Lien | 375/111 |
| 4,229,815 | 10/1980 | Cummiskey | 370/84 |
| 4,408,333 | 10/1983 | Fujii | 375/95 |
| 4,498,176 | 2/1985 | Wagner | 371/47 |
| 4,506,165 | 3/1985 | Gulati et al. | 307/272 |
| 4,575,644 | 3/1986 | Leslie | 307/291 |
| 4,629,909 | 12/1986 | Cameron | 307/279 |

OTHER PUBLICATIONS

Delay-Free Asynchronous Circuits with Constrained Line Delays, IEEE Transactions on Computers, Feb. 1969.

Primary Examiner—Benedict V. Safourek
Assistant Examiner—Marianne Huseman
Attorney, Agent, or Firm—Wilbert Hawk, Jr.; Stephen F. Jewett; James M. Stover

[57] ABSTRACT

A circuit for the stable synchronization of an asynchronous data signal. The circuit comprises a first latch for receiving a first asynchronous data signal, a first delayed system clock signal, and a synchronized reset signal and for providing a system clock synchronized version of the first asynchronous data signal. A first delaying circuit receives a system clock signal and the first asynchronous data signal and provides the first delayed system clock signal. The circuit also includes a second latch for receiving a second asynchronous data signal which is a function of the inverse of the first asynchronous data signal and a second delayed system clock signal, and for providing the synchronized reset signal. A second delaying circuit receives the system clock signal and the first asynchronous data signal and provide the second delayed system clock signal.

36 Claims, 4 Drawing Sheets

CIRCUIT FOR STABLE SYNCHRONIZATION OF ASYNCHRONOUS DATA

The present invention relates generally to circuits for the synchronization of asynchronous data signals and, more particularly, to a synchronizer circuit having a stable storage device.

BACKGROUND OF THE INVENTION

Computer systems frequently are called upon to receive data from external sources. When such data has an unknown temporal relationship to the computer system it is referred to as asynchronous data. In order to detect and store asynchronous data, timing signals are typically provided by the computer system from one or more system clocks. These timing signals, in the form of pulses, are received by various logic and storage elements in the system such as latches or flip-flops. When data is received by such elements, the subsequent receipt of the timing signal allows the element to store the data.

Since the asynchronous data signal and clock signal have no defined relationship they may arrive at the storage element at the same or different times. Normally, a data signal will be latched as soon as a clock signal is received. For example, an edge triggered flip-flop will latch data upon receipt of the leading or trailing edge of the clock pulse. However, a problem may arise if the data signal changes at approximately the same time as the triggering edge of the clock signal. A flip-flop requires the data signal (1) to be present for a predetermined period of time, known as the setup time, prior to receipt of the triggering clock edge, and (2) to remain unchanged for a predetermined period of time, known as the hold time, after receipt of the triggering edge, in order to cleanly latch the signal. If this does not occur, the latched value may be unstable. This so-called "metastable" condition may be characterized by oscillation or ringing of the output of the storage medium.

Asynchronous data may be characterized in two forms. In the first form the data is normally at a low state, transitions to a high state for some time to indicate the new value, and then transitions to the low state (the initial state) again. In the second form the data is at a high state, transitions to a low state for some time to indicate the new value, and then transitions to the high state (the initial state) again. The metastable condition may occur both at the leading edge or the trailing edge of the data signal if the transition of the new value does not meet the setup and hold time as required by the flipflop.

The metastable condition is normally a fairly rare occurrence. For that reason many computer systems rely on the small probability of the event and attempt to correct errors that happen. However, in some applications it is desirable to eliminate the condition.

OBJECTS OF THE INVENTION

It is therefore an object of the present invention to provide a new and improved circuit for stable synchronization of asynchronous data.

It is another object of the present invention to provide stable synchronization for asynchronous data that is normally at a low voltage level.

It is yet another object of the present invention to provide stable synchronization for asynchronous data that is normally at a high voltage level.

SUMMARY OF THE INVENTION

The present invention is a circuit for the stable synchronization of an asynchronous data signal. The circuit comprises first means for receiving a first asynchronous data signal, a first delayed system clock signal, and a synchronized reset signal and for providing a system clock synchronized version of the first asynchronous data signal. The first means includes a first latch. The circuit further comprises first delaying means for receiving a system clock signal and the first asynchronous data signal, and for providing the first delayed system clock signal. The circuit, also includes second means for receiving a second asynchronous data signal which is a function of the inverse of the first asynchronous data signal and a second delayed system clock signal, and for providing the synchronized reset signal. The second means includes a second latch. The circuit further includes second delaying means for receiving the system clock signal and the first asynchronous data signal, and for providing the second delayed system clock signal.

DETAILED DESCRIPTION OF THE INVENTION

Figure 1:
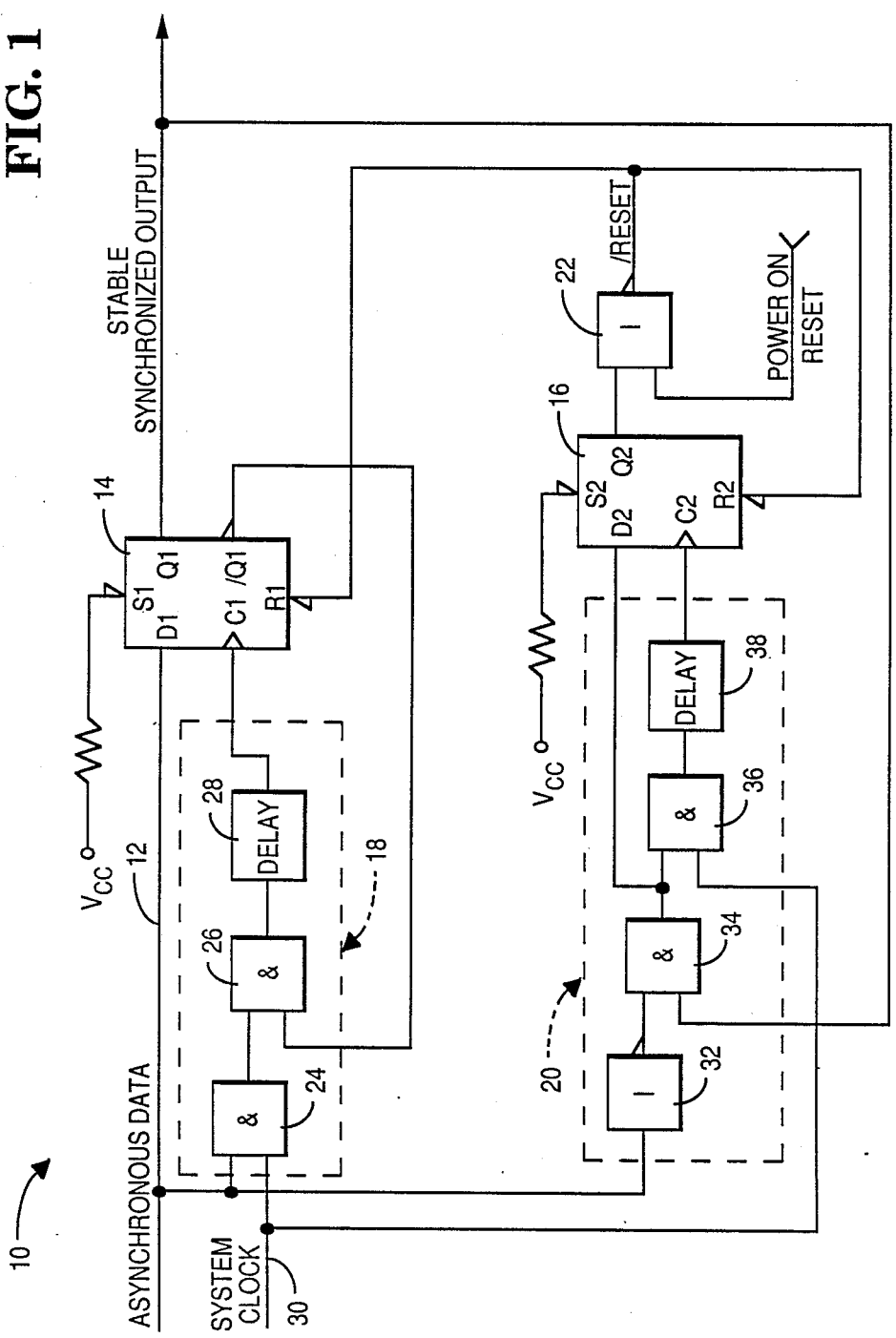
FIG. 1 is a circuit block diagram according to one form of the present invention.

FIG. 1 shows a circuit 10 for the stable synchronization of an ASYNCHRONOUS DATA signal on input line 12. Circuit 10 is particularly adapted to stable synchronization of an asynchronous data signal wherein the data is initially at a low state, transitions to a high state for some time to indicate the new value, and then transitions to the low state (the initial state) again. Circuit 10 comprises two latches 14 and 16 which in a preferred embodiment are D-type flip-flops, two delaying means 18 and 20, and a NOR gate 22. Each latch 14 and 16 has a set, data, clock, and reset input. These inputs are labeled S1, D1, C1, and R1 for latch 14 and are labeled S2, D2, C2, and R2 for latch 16. Latches 14 and 16 have outputs labeled Q1 and Q2, respectively, for storing data input signals. In addition, latch 14 has an output /Q1 which is the inverse of Q1.

With reference to latch 14, the D1 labeled input receives the ASYNCHRONOUS DATA signal on line 12. The S1 labeled input receives a fixed voltage level $V_{CC}$. The C1 labeled input receives a delayed timing or SYSTEM CLOCK signal. The R1 labeled input receives a synchronized reset signal. The Q1 labeled output provides a STABLE SYNCHRONIZED OUTPUT signal which is a SYSTEM CLOCK synchronized version of the ASYNCHRONOUS DATA signal. The /Q1 labeled output provides a signal which is the inverse of the STABLE SYNCHRONIZED OUTPUT signal.

Delaying means 18 includes coincidence gates 24 and 26 which are two input AND gates and a delaying circuit 28. Gate 24 receives as inputs the ASYNCHRONOUS DATA signal on input line 12 and the SYSTEM CLOCK signal on input line 30. Gate 26 receives as inputs the output of gate 24 and the output /Q1 of latch 14. Delaying circuit 28 has as an input the output of gate 26 and as an output a delayed SYSTEM CLOCK signal. Delaying circuit 28 may be any known circuit whereby the output signal is the input signal delayed by a predetermined time. For example, in a preferred embodiment delaying circuit 28 is a 50 ns active delay line.

With reference to latch 16, the D2 labeled input receives a signal which, as will be described more fully further on, is a function of the inverse of the ASYNCHRONOUS DATA signal. The S2 labeled input receives a fixed voltage level $V_{CC}$. The C2 labeled input receives a delayed SYSTEM CLOCK signal. The R2 labeled input receives the same synchronized reset signal as does latch 14. The Q2 labeled output is used as an input to NOR gate 22.

Delaying means 20 includes an inverter 32, coincidence gates 34 and 36 which are two input AND gates, and a delaying circuit 38. Inverter 32 has as an input the ASYNCHRONOUS DATA signal and as an output an inverted ASYNCHRONOUS DATA signal. Gate 34 receives as inputs the inverted ASYNCHRONOUS DATA signal and the STABLE SYNCHRONIZED OUTPUT signal from the Q1 labeled output of latch 14. As will now be clear, the signal output from gate 34 is a function of the inverse of the ASYNCHRONOUS DATA signal and is the data signal received by the D2 labeled input of latch 16. Gate 36 receives as inputs the output of gate 34 and the SYSTEM CLOCK signal. Delaying circuit 38 has as an input the output of gate 36 and as an output a delayed SYSTEM CLOCK signal. Delaying circuit 38 may be any known circuit whereby the output signal is the input signal delayed by a predetermined time. For example, delaying circuit 38 may be of the same type as delaying circuit 28. It should be clear that the delayed SYSTEM CLOCK signals received by the respective C1 and C2 labeled inputs of latches 14 and 16 are not the same signal.

NOR gate 22 receives as inputs the Q2 labeled output of latch 16 and a POWER ON RESET signal which is received during start up operation of circuit 10. The output of NOR gate 22, designated /RESET, is the synchronized reset signal received by the R1 and R2 labeled inputs of latches 14 and 16.

Figure 2:
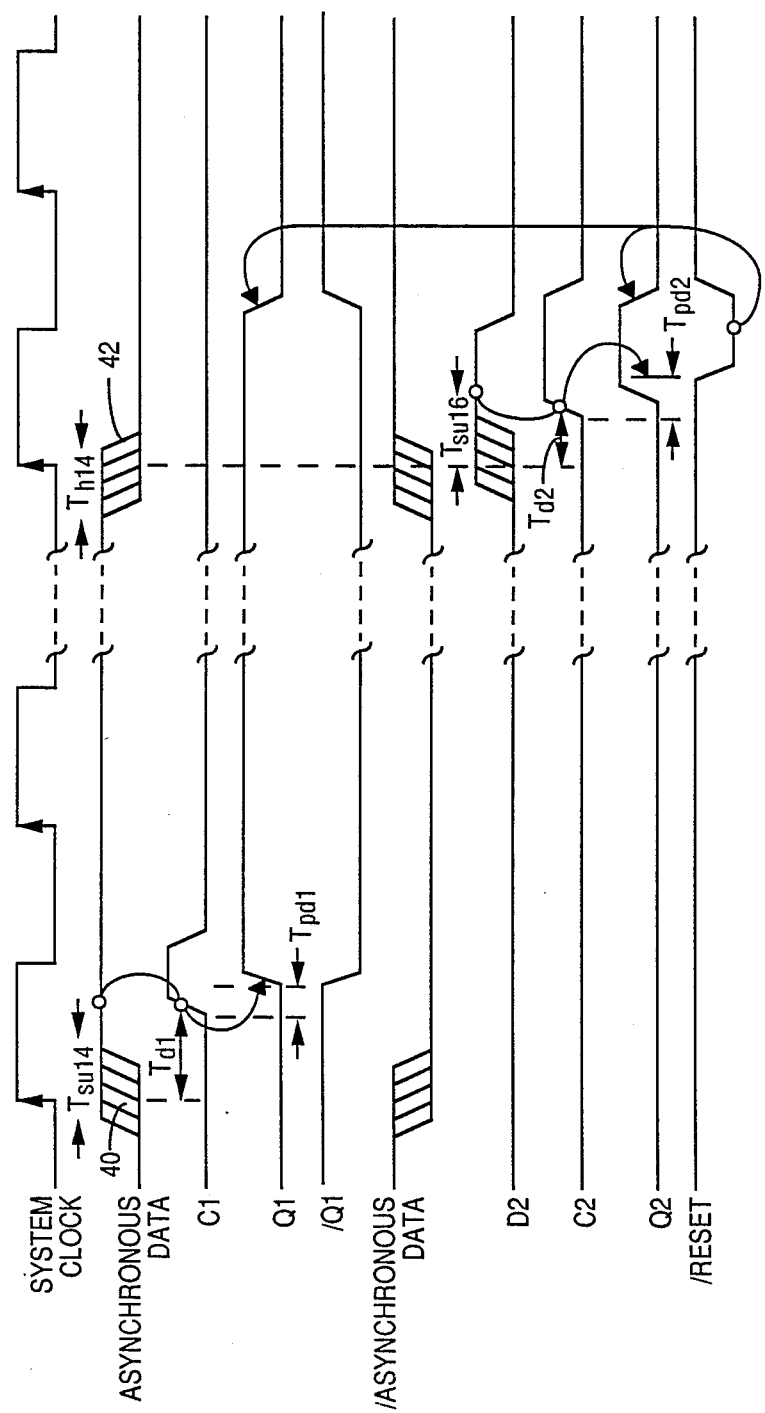
FIG. 2 is a group of waveforms illustrating the operation of the the circuit shown in FIG. 1.

The operation of circuit 10 is best understood by referring to the timing diagram, shown in FIG. 2, which reflects the operation of circuit 10. The SYSTEM CLOCK signal is shown as a periodic symmetrical string of pulses. The ASYNCHRONOUS DATA signal is shown with a leading edge transition low to high and a trailing edge transition high to low. The region 40, shown as an overlap of the low and high ASYNCHRONOUS DATA signals, represents the setup time $T_{su14}$ for latch 14. The setup time is the time the ASYNCHRONOUS DATA signal must be present prior to receipt of a signal at the input C1 of latch 14 in order to avoid a metastable condition in latch 14. The leading edge of the SYSTEM CLOCK signal is shown as occurring during this setup time. If latch 14 were to receive the SYSTEM CLOCK signal at input C1, the Q1 output would become metastable. However, the present invention prevents this condition by introducing a delay into the SYSTEM CLOCK signal through delaying means 18.

Delaying means 18 provides a single delayed SYSTEM CLOCK signal pulse to input C1 of latch 14 in response to the leading edge of each ASYNCHRONOUS DATA signal pulse. AND gate 24 only passes SYSTEM CLOCK signals when the ASYNCHRONOUS DATA signal is high. AND gate 26 only passes the pulses from gate 24 when the /Q1 output of latch 14 is high. Since it is understood that the Q1 output of latch 14 is initially low by the POWER ON RESET signal (the /Q1 output is high), AND gate 26 will pass the pulses from gate 24 until latch 14 latches the high ASYNCHRONOUS DATA signal. Since the ASYNCHRONOUS DATA signal will be latched as soon as input C1 receives a pulse, delaying means 18 will provide only one delayed SYSTEM CLOCK signal per ASYNCHRONOUS DATA signal pulse. Delaying means 18 delays the leading edge of the SYSTEM CLOCK pulse for a time $T_{d1}$ equal to or greater than the required setup time $T_{su14}$ of latch 14. It will be understood to those skilled in the art that gates 24 and 26 typically have a delay associated with their operation. Thus, the delay introduced by delaying circuit 28 need only be large enough so that the sum of the delays introduced by gates 24 and 26 together with that of circuit 28 be greater than or equal to $T_{su14}$. If the delay introduced by gates 24 and 26 is greater than or equal to $T_{su14}$, delaying circuit 28 is not required.

The Q1 output of latch 14 goes high (/Q1 goes low) after the receipt of the delayed SYSTEM CLOCK signal at C1 (Q1 will have a small propagation delay $T_{pd1}$) Since this cannot occur until after the setup time $T_{su14}$ of latch 14, latch 14 will not become metastable. In other words, the output Q1 is stable when the leading edge of the ASYNCHRONOUS DATA signal is latched.

The region 42, shown as an overlap of the high and low ASYNCHRONOUS DATA signals, represents the hold time $T_{h14}$ for latch 14. The hold time is the time the ASYNCHRONOUS DATA signal must be present after receipt of a signal at the input C1 of latch 14 in order to avoid a metastable condition in latch 14. The leading edge of the SYSTEM CLOCK signal is shown as occurring during this hold time. If latch 14 were to receive the SYSTEM CLOCK signal at input C1, the Q1 output would become metastable. However, the present invention prevents this condition by using a reset signal at R1 to reset latch 14 on the trailing edge of the ASYNCHRONOUS DATA signal. However, in order to ensure that the reset signal is itself stable, delaying means 20 is provided with latch 16.

Delaying means 20 provides a single delayed SYSTEM CLOCK signal pulse to input C2 of latch 16 in response to the trailing edge of each ASYNCHRONOUS DATA signal pulse. Inverter 32 provides an inverted form of the ASYNCHRONOUS DATA signal denoted /ASYNCHRONOUS DATA in FIG. 2. AND gate 34 only provides a high output signal when the /ASYNCHRONOUS DATA signal and the Q1 output of latch 14 are high. Thus, a necessary condition to the D2 labeled input to latch 16 receiving a high signal is that the /ASYNCHRONOUS DATA signal be high. In this sense, the D2 input to latch 16 receives a data signal which is a function of the inverse of the ASYNCHRONOUS DATA signal.

AND gate 36 only passes SYSTEM CLOCK signals when the D2 data signal is high. Since D2 goes high only on the trailing edge of the ASYNCHRONOUS DATA signal, the clock signal received by input C2 to latch 16 pulses once on this trailing edge. In order to avoid a metastable state in latch 16, delaying means 20 delays the leading edge of the SYSTEM CLOCK pulse for a time $T_{d2}$ equal to or greater than the required setup time $T_{su16}$ of latch 16. This ensures that a pulse will not be received by the C2 input until after D2 has been high for the setup time $T_{su16}$ of latch 16. As with delaying circuit 28, delaying circuit 38 may not be required if AND gate 36 delays the SYSTEM CLOCK signal for a time greater than or equal to $T_{su16}$.

The Q2 output of latch 16 goes high after the receipt of the delayed SYSTEM CLOCK signal at C2 (Q2 will have a small propagation delay $T_{pd2}$). Q2 is connected to the input of NOR gate 22 which also receives a POWER ON RESET signal as an input. When both of these inputs are inactive (logical lows) the output, denoted /RESET will be an inactive high. When either input goes active high, /RESET will become an active low which will reset both latches 14 and 16. For example, when Q2 goes high, output Q1 of latch 14 is reset low thereby avoiding a metastable state in latch 14 on the trailing edge of the ASYNCHRONOUS DATA signal. In other words, the output Q1 is stable when the trailing edge of the asynchronous data signal is latched.

Figure 3:
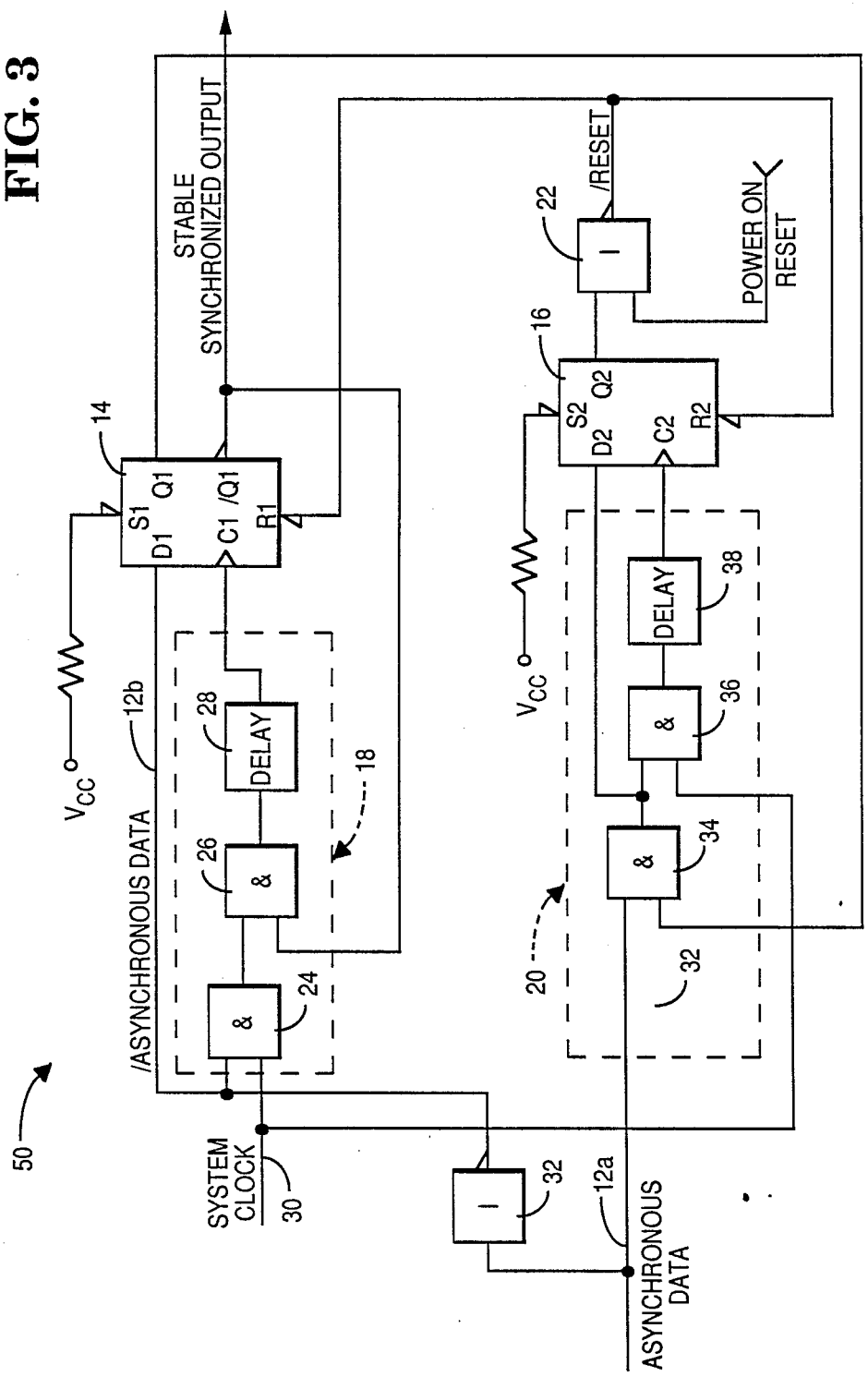
FIG. 3 is a circuit block diagram according to another form of the present invention.

FIG. 3 shows a synchronizer circuit 50 according to another form of the present invention. The FIG. 3 embodiment is particularly adapted to stable synchronization of an asynchronous data signal wherein the data is initially at a high state, transitions to a low state for some time to indicate the new value, and then transitions to the high state (the initial state) again. Circuit 50 comprises the same elements as circuit 10 (FIG. 1) with the same numbers referring to similar elements. However, in circuit 10 the asynchronous data signal applied to data line 12 is the same as the asynchronous data signal received by the D1 labeled input of latch 14. In contrast, the asynchronous data signal applied to data line 12a in circuit 50 is not the same as the asynchronous data signal received by the D1 labeled input of latch 14. Inverter 32 is interposed between the ASYNCHRONOUS DATA input line 12a and latch 14 in circuit 50 and is not part of delaying means 20 as it is in circuit 10. Data line 12b provides the inverse of the ASYNCHRONOUS DATA (hereafter referred to as ASYNCHRONOUS DATA) to the D1 labeled input of latch 14. /ASYNCHRONOUS DATA will also be applied to one of the inputs of AND gate 24. ASYNCHRONOUS DATA will be provided as an input to delaying means 20. Another feature of circuit 50 is that the STABLE SYNCHRONIZED OUTPUT is now provided by the inverted output /Q1 of latch 14. This is done to compensate for the effect of inverter 32.

Figure 4:
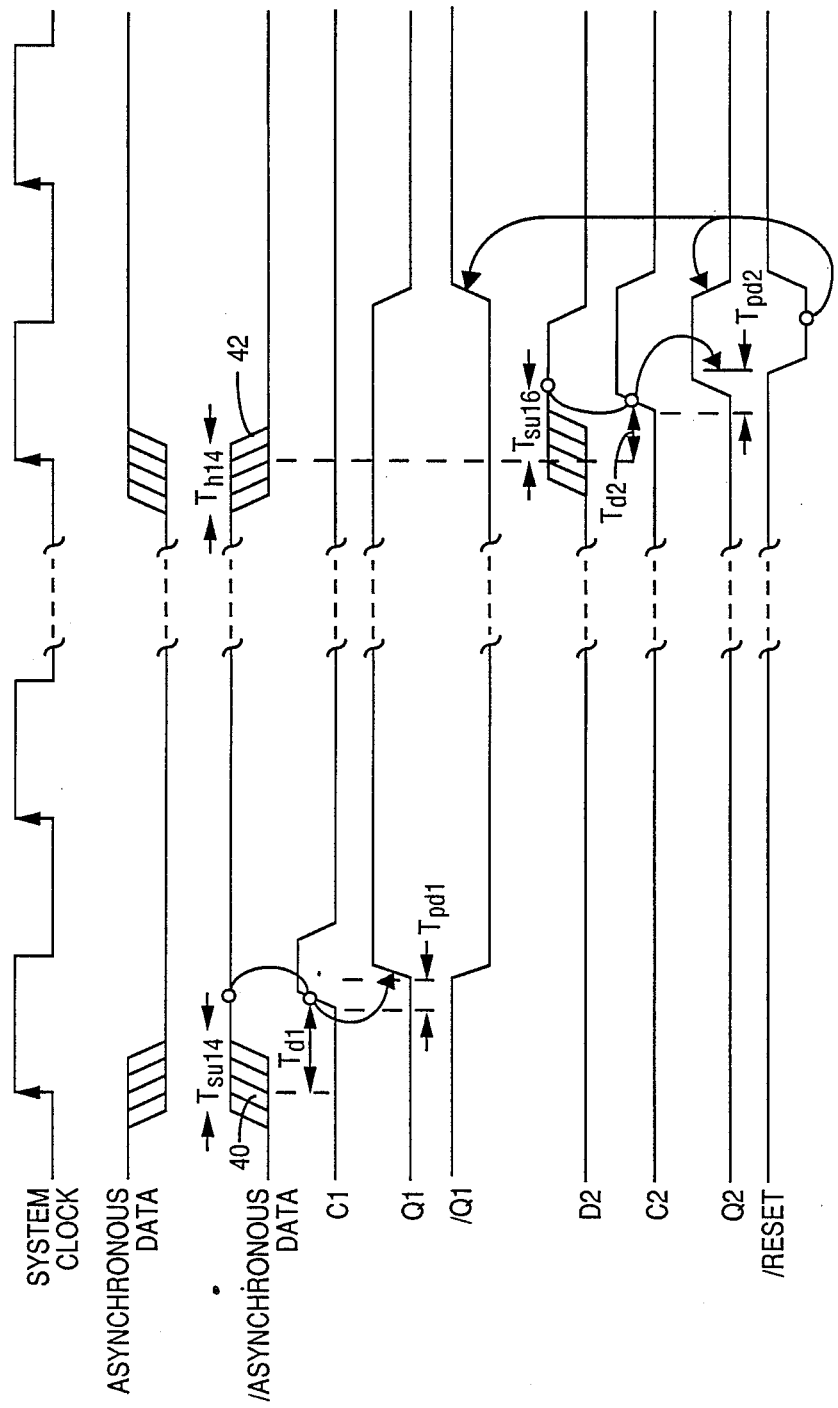
FIG. 4 is a group of waveforms illustrating the operation of the the circuit shown in FIG. 3.

In operation, circuit 50 will provide stable synchronization on both the leading and trailing edges of the ASYNCHRONOUS DATA signal. After inverting the ASYNCHRONOUS DATA signal through inverter 32, the operation of circuit 50 will be substantially similar to that of circuit 10. Timing diagrams for circuit 50 are shown in FIG. 4 but will not be discussed, their explanation will be found in the description of the timing diagrams for circuit 10 (FIG. 2).

As will be clear from the foregoing discussion, the preferred embodiments of the present invention provide synchronization to an asynchronous input signal and ensure that the synchronized signal will be stable.

It will be clear to those skilled in the art that the present invention is not limited to the specific embodiments disclosed and illustrated herein. Numerous modifications, variations, and full and partial equivalents can be undertaken without departing from the invention as limited only be the spirit and scope of the appended claims.

What is desired to be secured by Letters Patent of the United States is as follows.

What is claimed is

1. A synchronizer circuit comprising:
   first means for receiving a first asynchronous data signal, a first delayed system clock signal, and a synchronized reset signal and for providing a system clock synchronized version of said first asynchronous data signal, said first means comprising a first latch;
   first delaying means for receiving a system clock signal and said first asynchronous data signal, and for providing said first delayed system clock signal;
   second means for receiving a second asynchronous data signal which is a function of the inverse of said first asynchronous data signal and a second delayed system clock signal, and for providing said synchronized reset signal, said second means comprising a second latch; and
   second delaying means for receiving said system clock signal and said first asynchronous data signal and for providing said second delayed system clock signal.

2. The synchronizer circuit of claim 1 wherein said first delaying means comprises:
   a first coincidence gate having inputs for receiving said system clock signal and said first asynchronous data signal.

3. The synchronizer circuit of claim 2 wherein said first delaying means further comprises:
   a second coincidence gate having inputs for receiving the output of said first coincidence gate and the inverse of said system clock synchronized version of said first asynchronous data signal.

4. The synchronizer circuit of claim 3 wherein said first delaying means further comprises:
   a first delaying circuit having an input for receiving the output of said second coincidence gate and having an output for providing said first delayed system clock signal.

5. The synchronizer circuit of claim 3 wherein said first and second coincidence gates are two input AND gates.

6. The synchronizer circuit of claim 1 wherein said first latch is a D-type flip-flop.

7. The synchronizer circuit of claim 1 wherein said second delaying means comprises:
   an inverter having an input for receiving said first asynchronous data signal and an output for providing an inverted asynchronous data signal.

8. The synchronizer circuit of claim 7 wherein said second delaying means further comprises:
   a third coincidence gate having inputs for receiving the output of said inverter and said synchronized version of said first asynchronous data signal and having an output for providing said second asynchronous data signal.

9. The synchronizer circuit of claim 8 wherein said second delaying means further comprises:
   a fourth coincidence gate having inputs for receiving said system clock signal and the output of said third coincidence gate.

10. The synchronizer circuit of claim 9 wherein said second delaying means further comprises:
    a second delaying circuit having an input for receiving the output of said fourth coincidence gate and having an output for providing said second delayed system clock signal.

11. The synchronizer circuit of claim 9 wherein said third and fourth coincidence gates are two input AND gates.

12. The synchronizer circuit of claim 1 wherein said second latch is a D-type flip-flop.

13. The synchronizer circuit of claim 1 wherein said second means further comprises:
a two input NOR gate having inputs for receiving the output signal of said second latch and a power on reset signal, and having an output for providing said synchronized reset signal.

14. A synchronizer circuit comprising:
first means for receiving a first asynchronous data signal, a first delayed system clock signal, and a synchronized reset signal and for providing a system clock synchronized version of said first asynchronous data signal, said first means comprising an inverter for receiving at its input said first asynchronous data signal and providing at its output a second asynchronous data signal and a first latch having an input for receiving said second asynchronous data signal;
first delaying means for receiving a system clock signal and said second asynchronous data signal, and for providing said first delayed system clock signal;
second means for receiving a third asynchronous data signal which is a function of said first asynchronous data signal and a second delayed system clock signal, and for providing said synchronized reset signal, said second means comprising a second latch; and
second delaying means for receiving said system clock signal and said first asynchronous data signal and for providing said second delayed system clock signal.

15. The synchronizer circuit of claim 14 wherein said first delaying means comprises:
a first coincidence gate having inputs for receiving said system clock signal and said second asynchronous data signal.

16. The synchronizer circuit of claim 15 wherein said first delaying means further comprises:
a second coincidence gate having inputs for receiving the output of said first coincidence gate and said system clock synchronized version of said first asynchronous data signal.

17. The synchronizer circuit of claim 16 wherein said first delaying means further comprises:
a first delaying circuit having an input for receiving the output of said second coincidence gate and having an output for providing said first delayed system clock signal.

18. The synchronizer circuit of claim 16 wherein said first and second coincidence gates are two input AND gates.

19. The synchronizer circuit of claim 14 wherein said first latch is a D-type flip-flop.

20. The synchronizer circuit of claim 14 wherein said second delaying means comprises:
a third coincidence gate having inputs for receiving said first asynchronous data signal and the inverse of said synchronized version of said first asynchronous input signal, and having an output for providing said third asynchronous data signal.

21. The synchronizer circuit of claim 20 wherein said second delaying means further comprises:
a fourth coincidence gate having inputs for receiving said said system clock signal and the output of said third coincidence gate.

22. The synchronizer circuit of claim 21 wherein said second delaying means further comprises:
a second delaying circuit having an input for receiving the output of said fourth coincidence gate, and having an output for providing said second delayed system clock signal.

23. The synchronizer circuit of claim 21 wherein said third and fourth coincidence gates are two input AND gates.

24. The synchronizer circuit of claim 20 wherein said second latch is a D-type flip-flop.

25. The synchronizer circuit of claim 14 wherein said second means further comprises:
a two input NOR gate having inputs for receiving the output signal of said second latch and a power on reset signal, and having an output for providing said synchronized reset signal.

26. A synchronizer circuit comprising:
a first latch having inputs for receiving an asynchronous data signal, a first delayed system clock signal, and a synchronized reset signal and an output for providing a system clock synchronized version of said asynchronous data signal;
a first coincidence gate having inputs for receiving said system clock signal and said asynchronous data signal;
a second coincidence gate having inputs for receiving the output of said first coincidence gate and the inverse of said system clock synchronized version of said asynchronous data signal;
a first delaying circuit having an input for receiving the output of said second coincidence gate and having an output for providing said first delayed system clock signal;
a second latch having inputs for receiving an input data signal which is a function of the inverse of said asynchronous data signal and a second delayed system clock signal;
an inverter having an input for receiving said asynchronous data signal and an output for providing an inverted asynchronous data signal;
a third coincidence gate having inputs for receiving the output of said inverter and said synchronized version of said asynchronous data signal and having an output for providing said input data signal to said second latch;
a fourth coincidence gate having inputs for receiving the output of said third coincidence gate and said system clock signal;
a second delaying circuit having an input for receiving the output of said fourth coincidence gate and having an output for providing said second delayed system clock signal; and
a two input NOR gate having inputs for receiving the output of said second latch and a power on reset signal and having an output for providing said synchronized reset signal.

27. The synchronizer circuit of claim 26 wherein said first and second latches are D-type flip-flops, and said first, second, third and fourth coincidence gates are two input AND gates.

28. A synchronizer circuit comprising:
an inverter for receiving at its input an asynchronous data signal and providing at its output an inverted asynchronous data signal;

a first latch having inputs for receiving said inverted asynchronous data signal, a first delayed system clock signal, and a synchronized reset signal and an output for providing a system clock synchronized version of said asynchronous data signal;

a first coincidence gate having inputs for receiving said system clock signal and said inverted asynchronous data signal;

a second coincidence gate having inputs for receiving the output of said first coincidence gate and said system clock synchronized version of said asynchronous data signal;

a first delaying circuit having an input for receiving the output of said second coincidence gate and having an output for providing said first delayed system clock signal;

a second latch having inputs for receiving an input data signal which is a function of said asynchronous data signal and a second delayed system clock signal;

a third coincidence gate having inputs for receiving said asynchronous data signal and the inverse of said synchronized version of said asynchronous data signal and having an output for providing said input data signal to said second latch;

a fourth coincidence gate having inputs for receiving the output of said third coincidence gate and said system clock signal;

a second delaying circuit having an input for receiving the output of said fourth coincidence gate and having an output for providing said second delayed system clock signal; and a two input NOR gate having inputs for receiving the output signal of said second latch and a power on reset signal and having an output for providing said synchronized reset signal.

29. The synchronizer circuit of claim 28 wherein said first and second latches are D-type flip-flops, and said first, second, third and fourth coincidence gates are two input AND gates.

30. A synchronizer circuit comprising:

a first latch having inputs for receiving an asynchronous data signal, a first delayed system clock signal and a reset signal, and an output for providing a system clock synchronized version of said asynchronous input signal; and first delaying means for receiving as inputs a system clock signal and said asynchronous data signal and an output for providing said first delayed system clock signal.

31. The synchronizer circuit of claim 30 wherein said first delaying means comprises:

a first coincidence gate having inputs for receiving said system clock signal and said asynchronous data signal.

32. The synchronizer circuit of claim 31 wherein said first delaying means further comprises:

a second coincidence gate having inputs for receiving the output of said first coincidence gate and the inverse of said system clock synchronized version of said asynchronous input signal.

33. The synchronizer circuit of claim 32 wherein said first delaying means further comprises:

a first delaying circuit having an input for receiving the output of said second coincidence gate and having an output for providing said first delayed system clock signal.

34. The synchronizer circuit of claim 33 wherein said first latch is a D-type flip-flop.

35. The synchronizer circuit of claim 34 wherein said first and second coincidence gates are two input AND gates.

36. A synchronizer circuit comprising:

a latch having inputs for receiving an asynchronous data signal, a timing signal and a reset signal, and an output for providing a system clock synchronized version of said asynchronous data signal;

means for delaying said timing signal for a predetermined period of time after the leading edge of said asynchronous signal has been received by said latch, said predetermined time being not less than the set-up time of said latch, so that said output is stable when the leading edge of said asynchronous data signal is latched; and means for delaying said reset signal for a predetermined period of time after the trailing edge of said asynchronous signal has been received by said latch, said predetermined time being not less than the set-up time of said latch, so that said output is stable when the trailing edge of said asynchronous data signal is latched.

* * * * *